J. J. NEENAN, G. T. HANCHETT & M. E. NEENAN.
AUTOMATIC TRACTION ROPE TAKE-UP MECHANISM.
APPLICATION FILED AUG. 1, 1911.
1,126,260.
Patented Jan. 26, 1915.
4 SHEETS—SHEET 1.
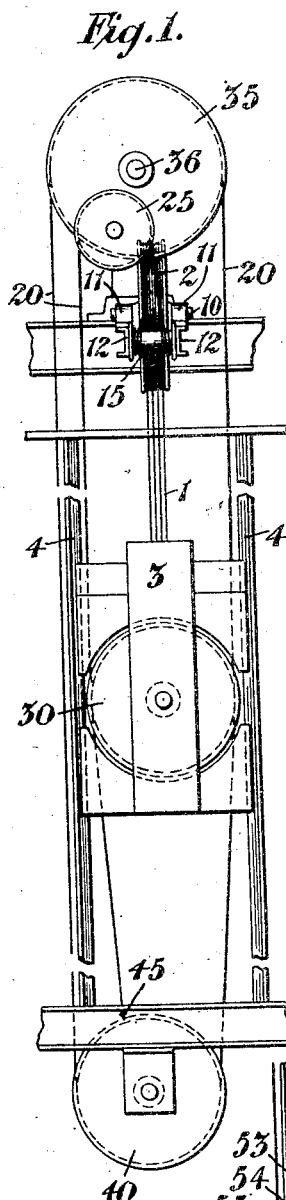
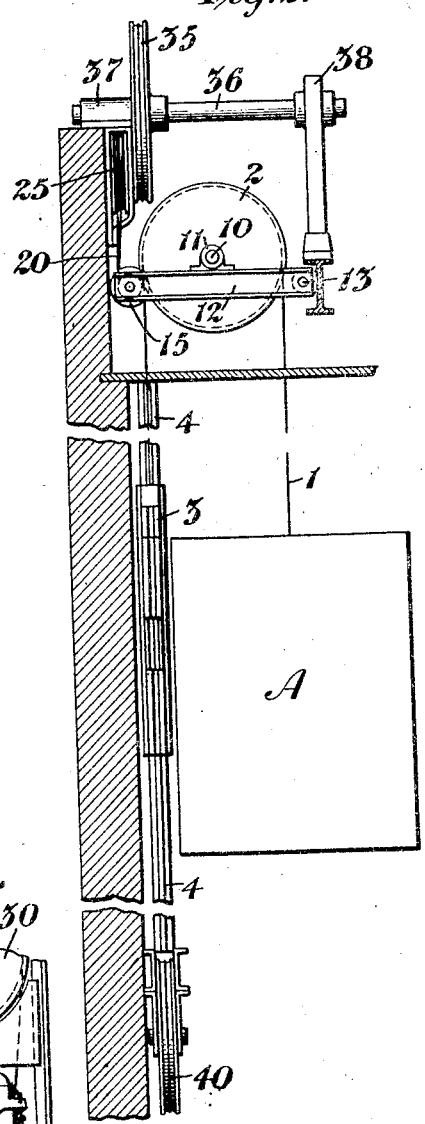
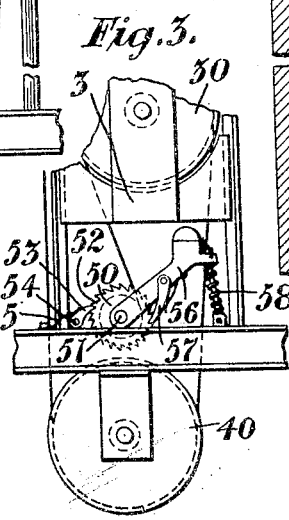

J. J. NEENAN, G. T. HANCHETT & M. E. NEENAN.
AUTOMATIC TRACTION ROPE TAKE-UP MECHANISM.
APPLICATION FILED AUG. 1, 1911.
1,126,260.
Patented Jan. 26, 1915.
4 SHEETS—SHEET 2.
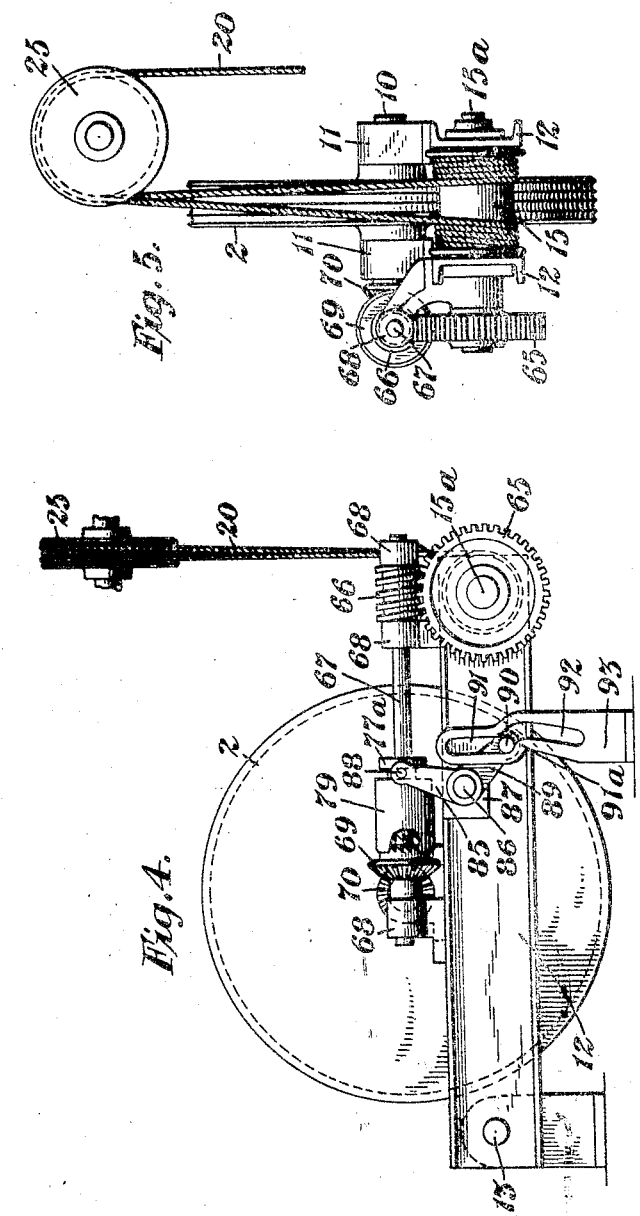
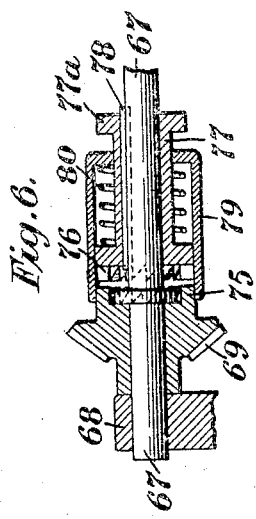

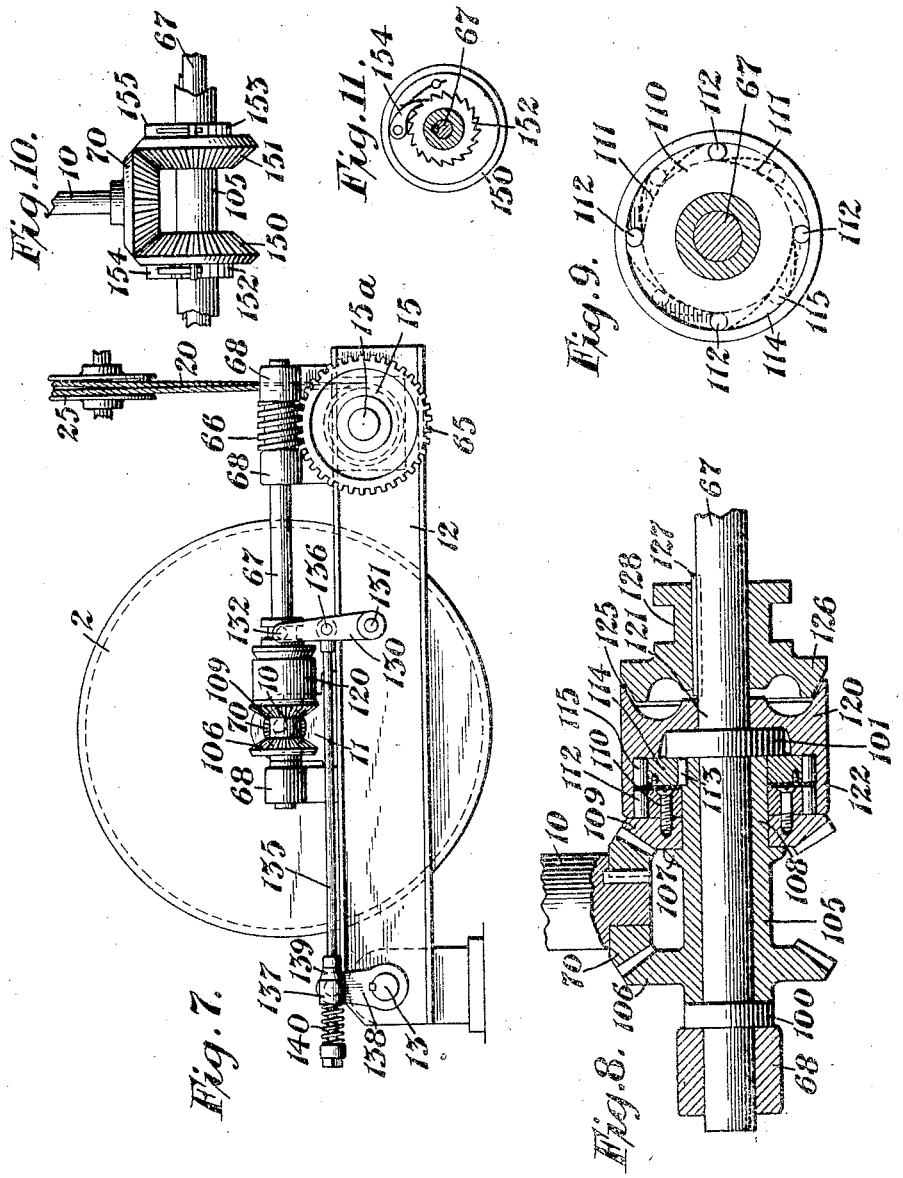

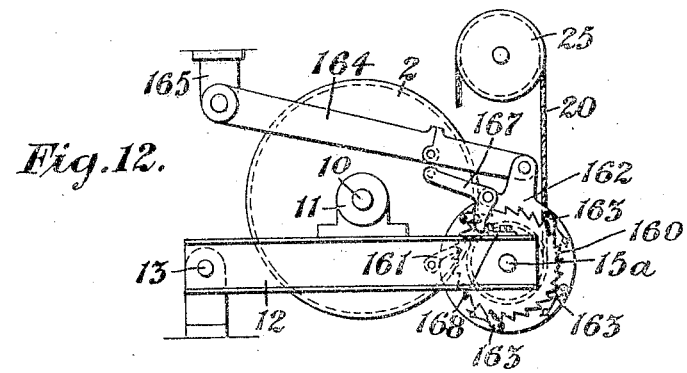

UNITED STATES PATENT OFFICE.

JOHN J. NEENAN, GEORGE T. HANCHETT, AND MICHAEL E. NEENAN, OF NEW YORK, N. Y.

AUTOMATIC TRACTION-ROPE-TAKE-UP MECHANISM.

1,125,260.

Specification of Letters Patent.

Patented Jan. 26, 1915.

Application filed August 1, 1911. Serial No. 641,723.

*To all whom it may concern:*

Be it known that we, JOHN J. NEENAN, of the borough of Bronx, city, county, and State of New York, GEORGE T. HANCHETT, of the borough of Manhattan, city, county, and State of New York, and MICHAEL E. NEENAN, of the borough of Bronx, city, county, and State of New York, all citizens of the United States, have invented certain new and useful Improvements in Automatic Traction-Rope-Take-Up Mechanism, of which the following is a specification.

In the operation of traction rope mechanism, the ropes stretch from time to time, and especially while the installation is new, so that it is necessary to provide means for taking up the rope to maintain the operative parts of the mechanism in proper working relation. This is particularly true with regard to traction elevators.

The present invention has for its object to provide automatic traction rope take-up mechanism to insure the constant normal working relation of the parts of said mechanism, and to this end the present invention comprises automatic traction rope take-up mechanism thrown into operation by the stretching or lengthening of the traction ropes.

The invention consists, more particularly, of a rope traction mechanism having a take-up drum or pulley to which one end of the traction rope is attached, operating mechanism for said take-up drum or pulley, and means, actuated by the variations of some operative part of the traction mechanism for throwing said take-up operating mechanism into and out of action. The variations of the operative part relied upon for causing and arresting the take-up operation are the changes from and into normal positions of the selected part of the mechanism, caused by the stretching or lengthening of the traction rope. In the application of the invention to traction elevators, the means for throwing in and out the take-up operating mechanism may be actuated by the variations of the traveling counterweight or of some form of automatic tension compensating device. The particular form of the practical application of the invention is not essential.

The present invention has been designed with particular reference to the type of traction elevators covered by the patent of Michael E. Neenan No. 998,629 granted July 25th, 1911. In the practical construction of this Neenan type of elevator, the car supporting sheave is mounted upon a pivoted beam located at the top of the car well and sustained in its normal horizontal working position by the hoisting rope which passes in opposite directions from the motor driven drum around suitable fixed sheaves, and sheaves mounted above the traveling car and counterweight. The car is hung from suitable supporting ropes passing over the car supporting sheave and attached at their ends to the car and the traveling counterweight. With this type of elevator, the tension upon the hoisting ropes, and consequently the friction between the driving drum and said ropes, varies with the load upon the car.

In this application of our invention to the elevator of the Neenan patent above referred to, we utilize the pivoted or tilting beam (upon which the car supporting sheave is mounted) to throw the improved take-up mechanism into and out of action; the end of the hoisting rope (or ropes) passing from the fixed sheave above the movable end of the pivoted beam being secured to a take-up drum or pulley journaled in stationary bearings or upon said beam, and suitable automatically operating winding means being provided for said take-up pulley or drum with a controlling device actuated by the variations in position of said beam for throwing into and out of action the winding means. The normal horizontal working position of the tilting beam holds the take-up winding means out of action while the lowering of said beam (caused by the stretching of the ropes which support it) throws said winding means into action.

In order that our invention may be fully understood, we will first describe the same with reference to the accompanying drawings and afterward point out the novelty more particularly in the annexed claims.

In said drawings: Figures 1 and 2 are elevations of elevator mechanisms of the Neenan type to which our invention is to be applied, said elevations being taken at right angles to each other. Fig. 3 is a detail side elevation of one form of rope take-up mechanism embodying our invention. Fig. 4 is a detail side elevation and Fig. 5 is a detail end view of a modified form of our invention in which the take-up drum or pulley is journaled upon a pivoted beam carrying the car supporting sheave. Fig. 6 is a detail longitudinal sectional view of the automatic clutch forming part of the mechanism shown in Figs. 4 and 5. Fig. 7 is a view similar to Fig. 4 showing a further slight modification. Fig. 8 is a detail longitudinal sectional view of the clutch mechanism forming part of the mechanism shown in Fig. 7. Fig. 9 is a transverse sectional view of the same form of clutch, clutch disk 114 and clutch elements 115 being shifted somewhat from their positions shown in Fig. 8. Figs. 10 and 11 are respectively a detail side elevation and a detail transverse sectional view of a further modification embodying a double-acting ratchet clutch. Figs. 12, 13, 14, 15, 16 and 17 are detail views illustrating further modified forms of our invention.

While our invention is applicable to traction rope mechanisms of various types, we have designed the same with particular reference to elevator mechanisms and for the purpose of illustrating the principles involved in our invention, we have shown in the accompanying drawings various forms of the invention applied to an elevator construction of the type covered by the above named patent of Michael E. Neenan.

Referring first to Figs. 1, 2 and 3 of the drawings, A represents an elevator car suspended from one or more ropes or cables 1 which pass over the car supporting sheave 2 and down to the car counterweight 3 which operates in suitable guideways illustrated at 4. The car supporting sheave 2 is mounted upon a shaft 10 journaled in suitable bearings 11 secured to a pair of beams or levers 12 pivotally mounted at one end at 13 so as to move freely upon the pivot in a vertical plane. Suitably journaled in the free ends of the pivoted beams or levers 12 is a take-up sheave or pulley 15 to which are attached the upper ends of the traction ropes or cables indicated at 20. These traction ropes or cables 20 may be of any desired number. Two of such cables are shown in the drawings. From the take-up sheave or pulley 15 cables 20 pass up and around an idler sheave or pulley 25 journaled in suitable stationary bracket bearings at the top and thence downwardly to the counterweight 3 where they are led around an anti-friction pulley 30 freely journaled in the counterweight 3. From the wheel or pulley 30 the cables 20 pass upwardly over the main sheave 35 mounted upon shaft 36 suitably journaled in bearings 37 and 38 at the top of the car well. From the sheave 35 cables 20 pass downwardly around a motor driven sheave or drum 40 at the bottom of the car well and from thence upward around the anti-friction sheave or pulley 30 upon the counterweight 3 and then down to a stationary point indicated at 45.

To maintain the operative parts of a rope traction mechanism in proper working relation, it is necessary to retain the traction rope under proper tension, which can be accomplished only by taking up the slack and stretch of the rope from time to time as the variations in positions of the parts may require. Our invention accomplishes this important result.

In the type of mechanism shown in Figs. 1 and 2, the automatic take-up may be arranged at either end of the rope. In most of the forms of our invention, we have applied the take-up to operate upon the sheave or pulley 15 which is journaled upon the pivoted beams 12. Such arrangement will be hereinafter described.

In Fig. 3, we have shown a take-up wheel or pulley 50 journaled on the shaft 51 suitably supported upon the frame beams at the bottom of the elevator well. The sheave or pulley 50 has the lower ends of the traction ropes or cables suitably fastened to it. Secured to sheave or pulley 50 is a ratchet wheel 52 constantly engaged by a retaining dog 53 pivoted at 54 and held in operative position by a spring such as 55. Journaled upon shaft 51 is a rock arm 56 carrying a spring pressed dog 57 held in engagement with the ratchet wheel 52. This rock arm 56 is yieldingly supported by a spring device shown at 58 directly in the path of the car counterweight 3 so that in the event of the counterweight moving down to an unusual degree by reason of the stretching of the ropes or cables 20, the rock arm 56 will be engaged to be moved downwardly against the action of its spring 58 to cause dog 57 to rotate sheave or pulley 50 and thereby take up part of the excess of length in the cables 20. The stroke of the rock arm 56 will depend upon the extent of stretch in the traction cables 20 at the moment the counterweight approaches the lower limit of its travel.

We prefer to provide an automatic rope take-up in accordance with our invention upon the pivotally mounted tension beam of the Neenan type of elevator. One form of the invention embodying this arrangement is shown in Figs. 4, 5 and 6 of the drawings, in which 12 is the pivotally mounted double beam having journaled upon it the car supporting sheave 2 substantially as illustrated in Figs. 1 and 2 of the drawings. The take-up sheave or pulley 15 is mounted between the two beam members 12 upon the short transverse shaft 15$^a$ which is suitably journaled in the beam members. The traction ropes 20 passing from the idler sheave or pulley 25 are wound upon and attached to the take-up sheave or pulley 15.

Keyed to the short shaft 15$^a$ is a worm gear 65 meshing constantly with a worm 66 upon shaft 67 which is journaled in bracket bearings 68 supported upon one of the beam members 12. Freely journaled upon the worm shaft 67 is a bevel gear 69 in constant mesh with a similar gear 70 keyed to the journal shaft 10 of the car supporting sheave 2. The bevel gear 69 carries a toothed clutch member 75 which may be integral with the gear or otherwise rigidly secured to it. A movable toothed clutch member 76 is formed with an outwardly flanged barrel portion 77 which slides upon and is splined to the shaft 67 by means of a key 78. A spring 80 surrounding the barrel portion 77 is confined between the clutch head and an internal flange upon the surrounding tubular member 79. A rock arm 85 is mounted on a short rock shaft 86 journaled upon bracket 87 secured to one side of a beam member 12. This rock arm 85 carries an inwardly presented pin 88 which is adapted to engage the inwardly flanged end of tubular member 79 so that the movement of rock arm 85 toward gear 69 will compress spring 80 and throw the movable clutch member 76 into engagement with the fixed clutch member 75. Pin 88 normally engages flange 77ª on sleeve 77 to hold the movable clutch member 76 away from the fixed clutch member 75. Short rock shaft 86 carries a downwardly presented rock arm 89 having a lateral pin or lug 90 which operates in the two-part slot 91, 92 of the stationary controlling plate or bracket 93. The plate or bracket 93 is mounted upon a fixed support not shown.

Since all of the parts described, excepting the plate or bracket 93, are mounted upon the movable beam members 12, it will be clear that, upon the stretching or lengthening of the traction ropes or cables 20, the beams 12 (which are supported by said ropes or cables), will move downwardly and that a sufficient downward movement of the supporting beams will throw the pin or lug 90 into engagement with the cam shoulder 91ª between the upper and lower parts of the slot 91, 92, and as said pin moves from the control of slot 91 into the control of slot 92, rock shaft 86 will be moved for forcing clutch 75, 76 into engagement. Since the meshing gears 69 and 70 are operated by the movement of the car supporting sheave 2, the worm shaft 67 will be driven (while the car is in motion) to cause a limited winding action on the take-up sheave or pulley 15. This winding action continues, during the movement of the car, until the shortening of the traction ropes or cables raises the supporting beams 12 to their normal position, with the result that the pin 90 will move back into the upper slot 91 and throw out the clutch 75, 76. It will of course be understood that with this form of the device, the winding action can take place only when the car is moving in one direction, since the construction of the clutch is such that it will drive shaft 76 in one direction only.

In Figs. 7, 8 and 9 of the drawings, we have shown a further modification in which the take-up sheave or pulley 15 upon the pivoted tension beams 12 will operate for shortening the traction ropes or cables while the car is traveling in either direction. In this form of the mechanism, the worm shaft 67 having worm gearing 65, 66 with the take-up sheave or pulley, is mounted in bracket bearings 68 in the same manner as described with reference to Figs. 4, 5 and 6, but the form of clutch for gearing said shaft to the car supporting sheave 2 is of different form. The shaft 67 in this modified form is provided with two annular collars 100 and 101 between which is confined a freely journaled sleeve 105 having formed integral with it or otherwise rigidly secured to it a bevel gear 106 which is in constant mesh with the bevel gear 70 keyed to the shaft 10 of car supporting sheave 2. This sleeve 105 is formed with an annular flange 107 and a cylindrical bearing portion 108 projecting to one side of said flange 107. A bevel gear 109 is freely journaled upon the bearing 108 of sleeve 105 and confined against the collar 107 in constant mesh with the gear 70. Secured to the face of gear 109 is the inner fixed member 110 of a roller clutch, said member comprising a plate secured to gear 109 and formed with peripheral cam recesses 111 in which rest the clutch rolls 112. Keyed at 113 to an extension of the sleeve member 108 is the inner fixed member 114 of a second roller clutch, said member 114 being formed with peripheral eccentric notches in which rest the clutch rolls 115. 120 is a cylindrical clutch member journaled upon shaft 67 at 121 and formed with a circular rim 122 which fits over the two fixed clutch members 110 and 114 and constitutes the movable clutch member for both of said fixed clutch members. The clutch rolls of both of the roller clutches referred to are adapted to clamp with the inner face of the clutch rim 122. The outer face of cylindrical member 120 is formed with a conical clutch recess 125 with which coöperates a movable cone-shaped clutch member 126 splined at 127 upon the shaft 67. A rock arm 130 is journaled at 131 upon one of the pivoted beams 12 and carries an inwardly presented pin 132 engaging the grooved collar 128 of movable clutch member 126. A rod or pitman 135 is pivoted at 136 to rock arm 130 and extends therefrom through a bearing collar 137 journaled upon an arm 138 rigidly fixed upon the pivot shaft 13 of the beams 12. The collar 139 upon rod 135 engages the bearing 137 upon one face, and a confined spring 140 secured upon the end of rod 135 engages the collar 137 upon its opposite face. The result of this construction is that in the event of the stretching of the traction ropes or cables sufficiently to allow the lowering of beams 12, the clutch 125, 126 will be thrown into action and since the member 120 is always driven in the same direction while the car is traveling, the take-up sheave or pulley will be actuated until the beam 12 is returned to its normal horizontal position when the clutch 125, 126 will be automatically thrown out.

In Figs. 10 and 11 of the drawings, we have shown a further slight modification which forms a substitute part of the mechanism shown in Figs. 7 and 8. In this modification, bevel gears 150 and 151 are freely journaled upon a sleeve such as 105 (shown in Fig. 8) which sleeve is freely journaled upon the shaft 67. These gears 150 and 151 are in constant mesh with the bevel gear 70 upon the shaft 10 so that they will be constantly driven in opposite directions. Keyed to the sleeve 105 alongside of said gears 150 and 151 are ratchet wheels 152 and 153, which are respectively constantly engaged by actuating dogs 154 and 155 pivotally mounted upon the outwardly presented faces of the gears 150 and 151 respectively. Fig. 10 does not show a complete mechanism, but it will be understood that the sleeve 105 of said figure is designed to have secured to it a clutch member such as 125 of Fig. 8 and that there will be coöperating with said sleeve clutch member, a clutch member such as 126 of Fig. 8, which is splined to the shaft 67. In other words, the mechanism shown in Figs. 10 and 11 takes the place of the double-acting roller clutch of the form shown in Figs. 7, 8 and 9. With this arrangement, the sleeve 105 is driven in the same direction from the reverse movements of sheave 2 caused by the upward and downward travel of the car. The stretching of the ropes or cables 20 sufficiently to permit the lowering of beams 12 far enough to throw into action clutch members 126 and 125 will cause a winding action upon the take-up sheave or pulley which returns the beam 12 to normal horizontal position and automatically throws out said clutch.

In Fig. 12, we show a further modified structure designed to be operated by the quick vertical movement of pivoted beams 12 caused by the stretch and reaction of the traction ropes or cables 20. In this form of mechanism, the take-up sheave or pulley journaled upon the free end of the pivoted supporting beams 12, has secured to it a ratchet wheel 160 with which engages a pivoted retaining dog 161 to prevent backward motion of the sheave or pulley. Freely journaled alongside of the ratchet wheel 160 is an oscillating pawl carrier 162 provided with a plurality of pivotally mounted spring pressed pawls 163 which are in constant engagement with the ratchet wheel 160. This pawl carrier 162 is connected through a knuckle jointed link 164 with a stationary bracket 165. A gravity bell crank controlling lever 167 is pivotally mounted upon the pawl carrier 162, and a stop plate 168 is adjustably mounted upon the upper edge of one of the beams 12 to limit the movements of the controlling lever 167. The long arm of the lever 167 projects to a point directly beneath the knuckle joint of the link 164 so as to break said joint and arrest the action of the take-up device when the beam 12 is in normal horizontal position. With this form of mechanism, it will be understood that the downward movement of the free end of pivoted beams 12 will cause jointed link 164 to pull the pawl carrier 162 to the left, and that the upward movement of beams 12 will cause the pawl carrier 162 to move to the right. The first or downward movement is caused by the stretching of the traction ropes or cables, while the return or upward movement is caused by the reaction. These two movements of the pawl carrier 162 cause a slight winding or take-up action through the pawl and ratchet mechanism described. In the event of the beams 12 being raised slightly above their normal horizontal position, the controlling lever 167 will break the knuckle joint of link 164 and thereby arrest the winding or take-up action of the device until the beams 12 are again lowered sufficiently to throw the parts into normal working position.

In Figs. 13 and 14 a simple form of mechanism embodying our invention is shown, in which the take-up sheave or pulley, journaled upon the free end of the pivoted beams 12, has keyed to its shaft a worm gear 170 in constant mesh with a worm shaft 171 journaled in bearings 172 upon beams 12. This shaft 171 has a crank handle 173 upon its end for manual operation to facilitate adjusting the tension of the ropes or cables when the apparatus is first installed or when, for any reason, the operative relation of the parts should be changed. The worm shaft 171 has keyed to it a ratchet wheel 174 engaged by a spring pressed pawl 175 pivotally mounted upon a gear 176 which is freely journaled upon the worm shaft 171 alongside of the ratchet wheel 174. This gear 176 is in constant mesh with a vertically arranged curved rack bar 177 secured to a stationary support (not shown) in operative relation to the mechanism just described. This mechanism also operates automatically from the stretch and reaction of the traction ropes or cables 20, the downward movement of beams 12 rotating gear 176 upon rack 177 and causing dog 175 and ratchet wheel 174 to rotate worm 171 and consequently wind the ropes or cables upon the take-up sheave or pulley. The upward or reaction movement of beams 12 causes no effect since the pawl 175 will merely move rearwardly upon the ratchet wheel 174 as the gear 176 rotates in the reverse direction. In the event of the beams being raised sufficiently to cause the gear 176 to rise above the upper end of the rack bar 177, the device will be automatically held out of action until a sufficient stretch of the ropes or cables again lowers the beams 12.

In Figs. 15 and 16, we have shown a further modified form, in which the automatic take-up is actuated by the up and down movements of the beams 12. In this form of the mechanism, a take-up sheave or pulley 180 is mounted upon a shaft 181 journaled in stationary bracket bearings 182 above the free end of the pivoted tension beams 12. A ratchet wheel 183 is secured at one end of the sheave or pulley 180, and a sheave or pulley 184 is secured to the ratchet wheel 183. The end of the traction ropes or cables 20 is attached to and wound upon the tension sheave or pulley 180 and from there they extend around an idler pulley 185 journaled above the beam pivot 18, and thence around a second idler pulley 186 journaled at 187 in the free end of beams 12. From the pulley 186 the ropes or cables 20 pass over the sheave or pulley 184 from which they pass through the various operative parts of the mechanism already described in connection with Figs. 1 and 2. Upon a stationary bracket 190 is pivoted a pawl or dog 191 operating in engagement with the ratchet wheel 183. An arm 192 projects from dog 191 and has pivotally mounted upon it a weighted controlling arm 193 which rests just above one of the beams 12, so as to disengage dog 191 from ratchet wheel 183 in the event of the take-up mechanism raising the beams 12 a sufficient distance above their normal horizontal position. It will be observed that in the operation of this form of the mechanism, the lowering of the free end of beams 12 by the stretching of the ropes or cables increases the distance between pulley 186 and pulley 184 so that the ropes or cables will be drawn around pulley 184 and cause it to rotate and carry with it the ratchet wheel 183 and take-up sheave or pulley 180, the pivoted dog 191 allowing said take-up action and preventing a reverse movement of the take-up sheave or pulley.

In Fig. 17, we have shown diagrammatically a further modification in which a take-up sheave or pulley indicated at 200 is located at the bottom of the elevator well or substantially at the point indicated at 45 in Fig. 1 of the drawings. The lower end of the traction ropes or cables 20 is attached to this take-up sheave or pulley 200. An electric motor 205 is connected by worm gearing 206 with the sheave or pulley 200 and the current supply wires 207 and 208 for the motor 205 are passed upward through the elevator well and connected respectively to the two contact members 209 and 210, arranged directly beneath the pivoted tension beams 12. Upon the stretching or lengthening of the ropes or cables 20, the tension beams 12 will be lowered to close the switch 209, 210 to throw into operation the motor 205 which will operate the take-up sheave or pulley 200 until the circuit is broken by the beams 12 resuming their normal position. The switch lever 209 may be adapted to return to normally raised position by constructing it of sufficient resiliency to cause it to rise when the pressure thereon is removed.

What we claim is:

1. In a traction mechanism, the combination of a traction rope or cable, with a take-up mechanism therefor normally inoperative, and means depending upon the lengthening of said rope for making said mechanism operative.

2. In a traction rope mechanism, the combination of a traction rope or cable, and a take-up sheave or pulley for said traction rope or cable, with normally inactive means actuated by the stretching or lengthening of the traction rope or cable for operating said take-up sheave or pulley.

3. In a traction rope mechanism, the combination of a traction rope or cable, and take-up mechanism adapted to reduce the length of said rope or cable, with normally inactive means actuated by the variations of an operative part of said traction mechanism for operating said take-up mechanism.

4. In a traction rope mechanism, the combination of a traction rope or cable, a take-up sheave or pulley for said traction rope or cable, operating mechanism for said take-up sheave or pulley, and means actuated by the stretch and reaction of said traction rope or cable for controlling said take-up operating mechanism.

5. In a traction rope mechanism, the combination of a traction rope or cable, take-up mechanism therefor, and an operative part supported in operating position by said traction rope, with means actuated by the variations in position of said operative part for operating said take-up mechanism.

6. In a traction rope mechanism, the combination with a traction rope or cable, of a traction compensating device including a take-up mechanism for said rope or cable automatically subject to the tension of said rope or cable.

7. In a traction rope mechanism, the combination of a traction rope or cable, a take-up sheave or pulley for said traction rope or cable, operating mechanism for said take-up sheave or pulley, and controlling means actuated by the stretch and reaction of said traction rope or cable for throwing into and out of action said take-up operating mechanism.

8. In a traction mechanism, the combination of a traction rope or cable with a take up mechanism, and means for controlling the operation of said take up mechanism, said means depending upon the stretching or lengthening of the traction rope or cable.

JOHN J. NEENAN.
GEORGE T. HANCHETT.
MICHAEL E. NEENAN.

Witnesses:
M. G. CRAWFORD,
HERBERT H. KNIGHT.